Feb. 21, 1950 A. K. OZAI-DURRANI 2,498,573
METHOD OF TREATING RICE
Filed Aug. 14, 1945 3 Sheets-Sheet 3
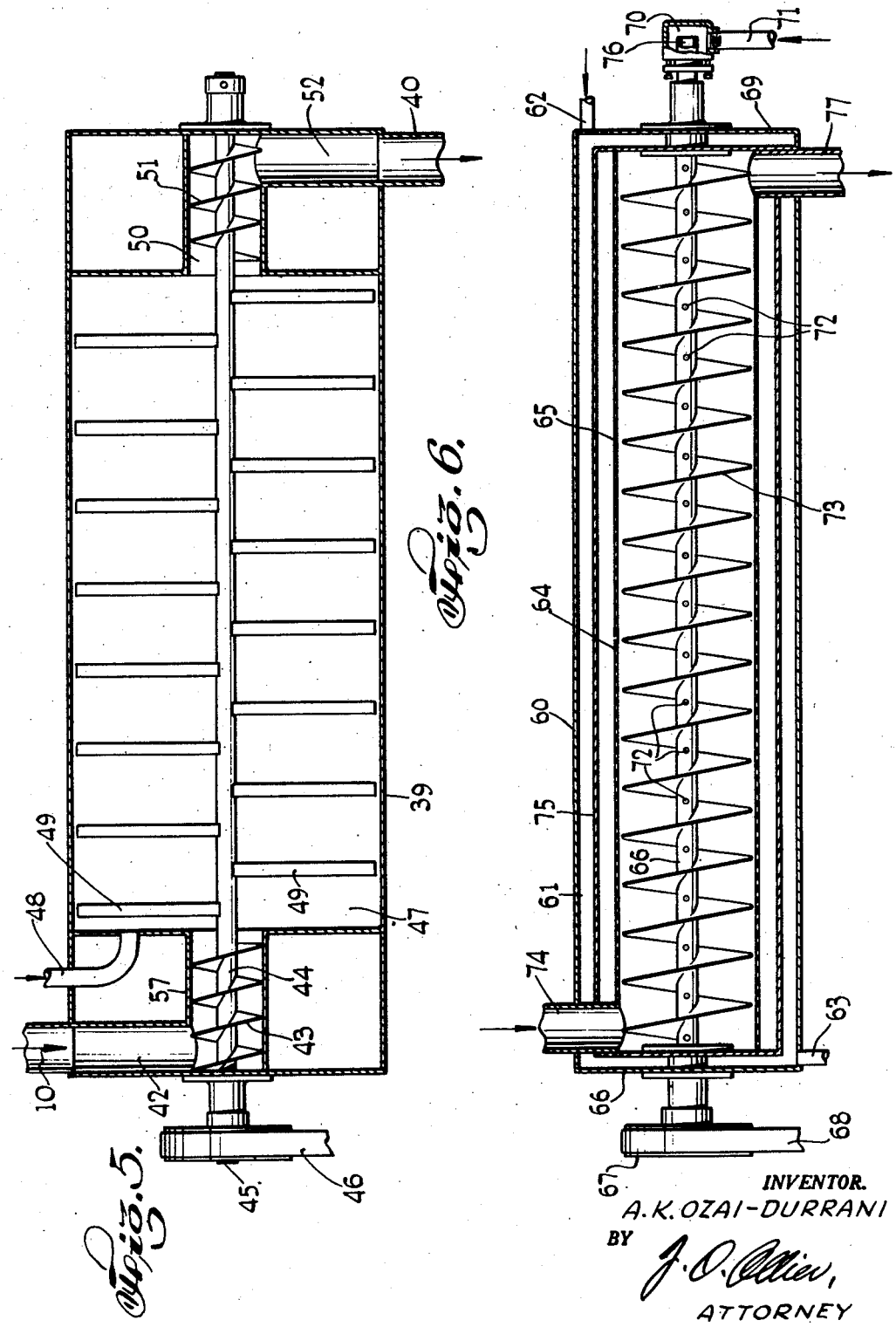
INVENTOR.
A. K. OZAI-DURRANI
BY
*J. O. Ollier,*
ATTORNEY Patented Feb. 21, 1950

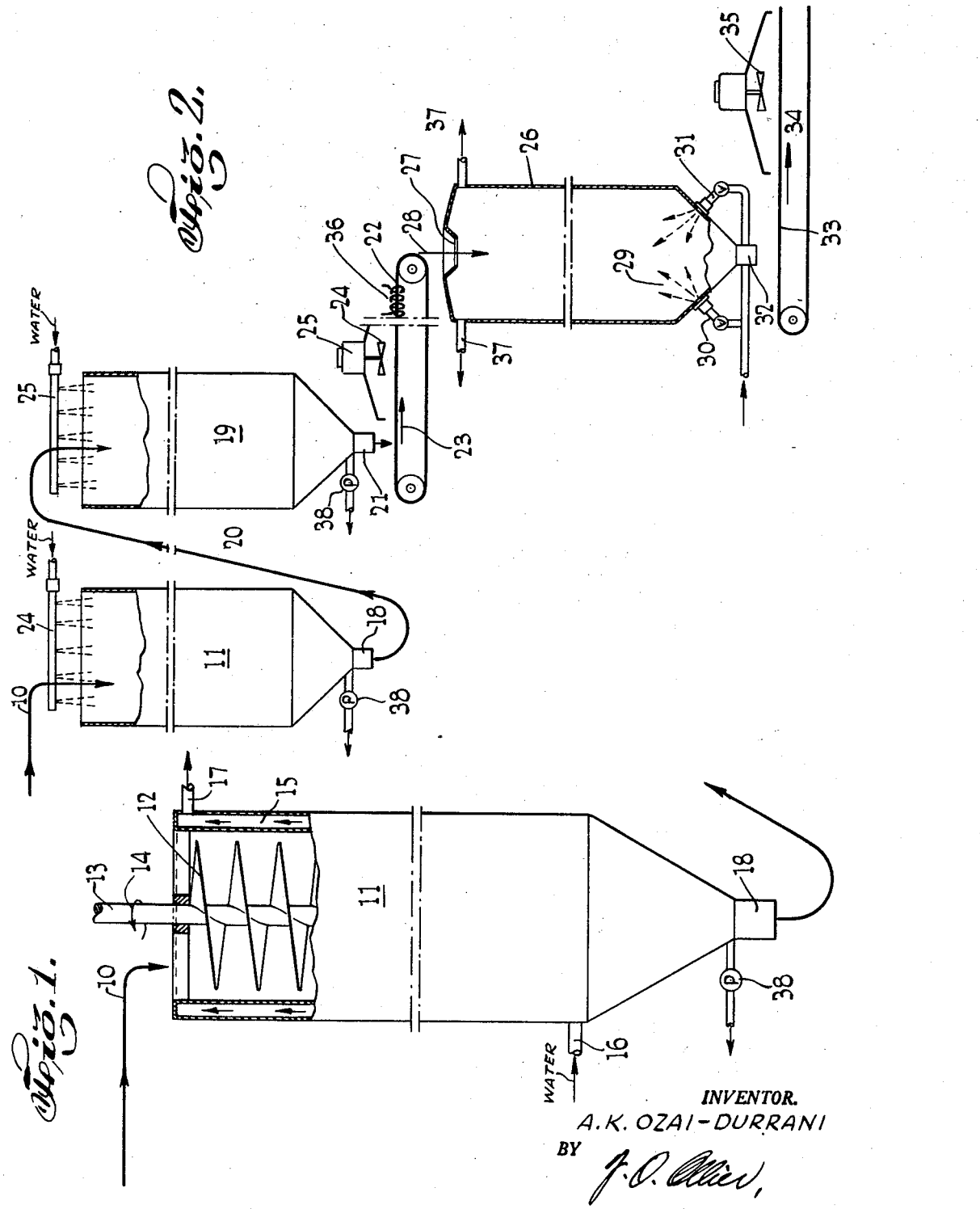

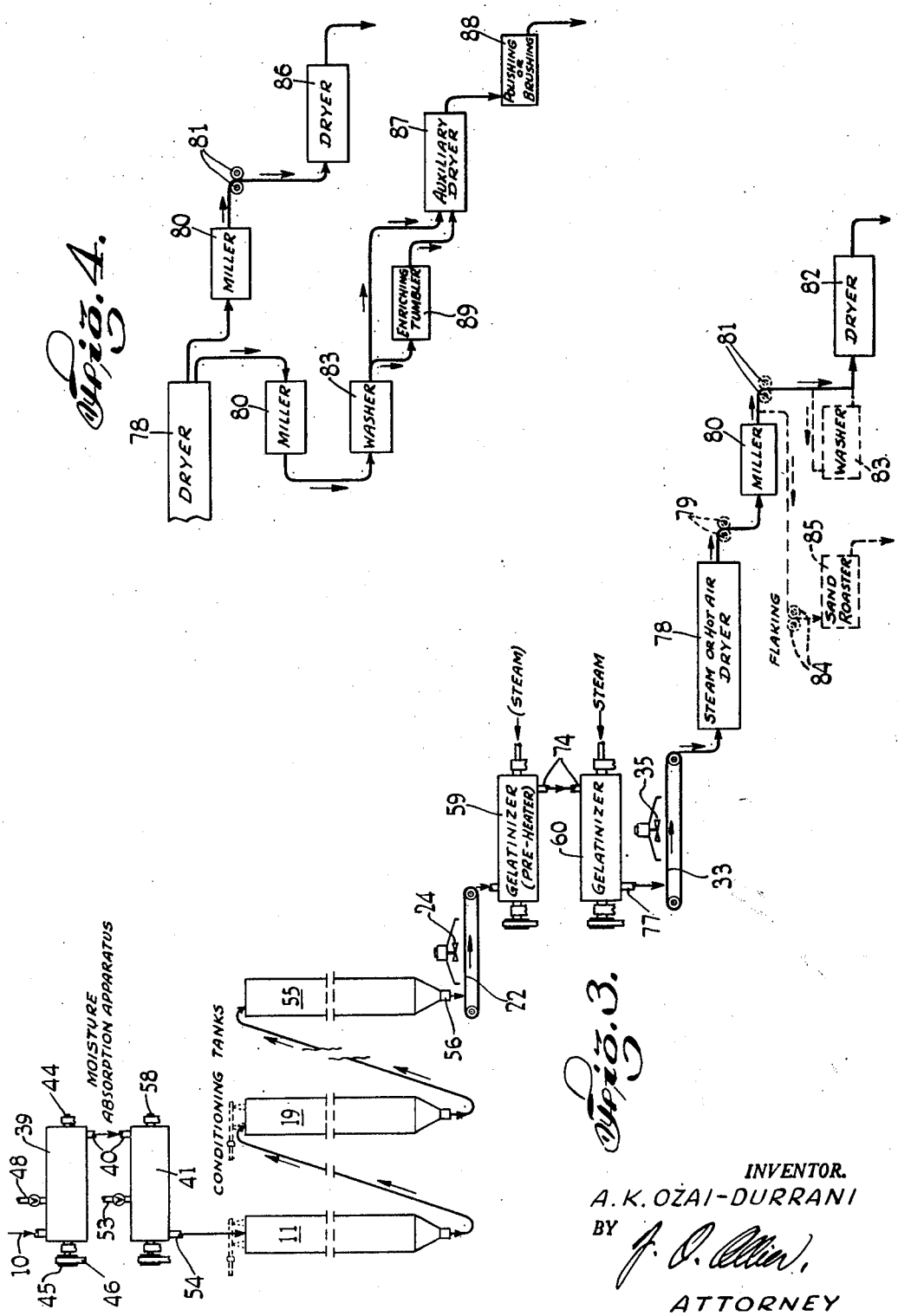

2,498,573

UNITED STATES PATENT OFFICE 2,498,573

METHOD OF TREATING RICE

Ataullah K. Ozai-Durrani, Stuttgart, Ark.

Application August 14, 1945, Serial No. 610,809

8 Claims. (Cl. 99—80)

This invention relates to a process for preparing rough rice or paddy for milling at proper consistency and moisture content, or for milling and subsequent processing.

It has been suggested to harvest rice when it has reached maturity, to bind and shock it, and to allow it to dry on the field until it reached the moisture content for milling, to thrash it thereafter and to mill it. With this method, valuable constituents of the rough rice contained in its hulls, including certain vitamins, minerals and salts, have been removed with the hulls and bran upon milling and polishing the rice.

It has been further suggested to thresh the harvested rice immediately, to reduce its moisture content by a vacuum treatment in an accelerated manner, and to gelatinize thereafter the rice by treating it with steam under high pressure. Thereby the rice acquired often an undesirable brown color, and the uncontrolled amount of water deposited on the rice grains from the steam was apt to dissolve and remove from the hulls valuable soluble constituents. Thereby again the nutritive value of the rice product and the yield on heads upon milling the rice was reduced.

It has also been proposed to harvest, shock and dry the rice on the fields, to thresh it thereafter and to swell it by soaking in either cold, warm, or hot water for an extended period of time, up to several days, to parboil the soaked rice and dry it again so that it contains moisture of about 14% at which it is usually milled best. Processes of this type require autoclaves or cookers for parboiling the soaked rice under steam pressure and are therefore not suited for economic mass production. By soaking the rice in a relatively large amount of water, valuable constituents contained in its hulls are washed out and drained off with the large excess of soaking water, leaving rough rice rather poor in nutritive constituents previously contained in its hulls. The breakage during milling was relatively large, whereby the average sales value of the rice product was further reduced.

It is an object of the invention to prepare rough rice for milling, or milling and subsequent further processing in a manner better suited for mass production than processes heretofore known.

It is another object of the invention to condition rough rice fo milling, or milling and subsequent processing, so that a maximum of its nutritive and other valuable constituents are retained in the rice product, and the yield on heads is largest.

It is a further object of the invention to subject rough rice to a treatment which can be performed with least supervision and relatively simple apparatus and is therefore adapted for mass production, and which yields a rice product of high quality, desired appearance and with least breakage of the grains.

It is still another object of the invention to prepare rice for milling, or milling and subsequent processing, in distinct process steps and in a controlled manner by providing it first with the proper moisture content for and during gelatinization and thereafter with another and lower moisture content suited for milling, so that upon milling large yields on heads result, and nutritive and other valuable constituents of the rough rice are retained therein to great extent. If further processing of the milled rice is intended, it is also an object of the invention to secure a proper consistency and particularly moisture content of the milled rice for those purposes.

These and other objects of the invention will be more clearly understood when the specification proceeds with reference to the drawings in which, by way of exemplification, Fig. 1 shows rather schematically in cross section and partly in elevation a tank or bin used for the purposes of the invention, Figs. 2, 3 and 4 flow sheets illustrating various embodiments of the invention, and Figs. 5 and 6 in cross section and partly in elevation a moisture absorption and gelatinizing apparatus, respectively.

Consistent with the objects of the invention, the rice is harvested upon maturity which is usually indicated, among others, by a moisture content of about 26 to 28% by weight of the rice. After or upon threshing its moisture content is reduced to about 10 to 16%. If the moisture content be larger, the threshed rice is dried in order to reduce its moisture content to less than about 16%. The rough rice of this moisture content is then either subjected immediately to the treatments according to the invention, or stored in usual, large bins until the treatments of the invention are applied thereto. In the latter case it is not essential whether the rice in the bins comes from the same fields and is harvested at the same time, or from different fields and is harvested at different times.

Whenever the rice is to be subjected to the treatment according to the invention, it is first subjected to preliminary cleaning, whereby foreign matter and husks which bear no grains are removed. Thereafter the actual moisture content of the rice is established by testing the moisture content of one or more samples in the laboratory or, in some cases, by a volumetric method based on the fact that the loading weight of rice depends largely on its prevailing moisture content. By comparing the loading or apparent weight of a sample with previously established standards the loading weight of the rice under examination can be established. In general, the preliminarily cleaned rice will contain between 10 and 16% and mostly about 13 to 14% moisture.

Thereafter the moisture content of the cleaned rough rice is raised to the maximum or saturation point which the rice grains can absorb and hold without gelatinization which I found to be about 29% by weight. Whereas, however, rough rice has been soaked heretofore in cool, warm or hot water in great excess of the amount which the rice can absorb, for one or more days, the invention controls the quantity of water so that it equals or only slightly exceeds that which the rice can absorb. In addition to thus measuring or dosing the quantity of water with which the rough rice is brought in contact, the temperature of the water is kept well below 70° C. and preferably below about 63° C. at which gelatinization sets in of the starch granules comprised by the rice grains. Germination or enzymic reactions in the rice grains are promoted to noticeable or even undesired extent if the rice is soaked over a longer period of time in water at temperatures above about 30° C.; therefore the invention prefers in some cases to soak the rice in the measured quantity of water at room or elevated temperature not exceeding about 30° C.

Since the actual average moisture content of the rough rice as threshed or taken from the bins has been established in a suitable manner such as indicated above, and the larger maximum moisture content (about 29% by weight) is known which rice can absorb up to its saturation point without gelatinization, the quantity of water can be calculated with which a given weight of rough rice should be brought in contact in order to raise its moisture content to saturation upon absorption of that quantity of water.

For example, if the actual moisture content of the rough rice is established to be 14% by weight, and its moisture content is to be raised to 29% by weight, a load of rice of given weight is to be contacted with a quantity of water the weight of which equals or slightly exceeds 15% of the weight of that rice load, or 11% of the dry rice.

To this effect, and with reference to Fig. 1, the rough rice 10 taken from one or more bins, and of a moisture content between 10 and 16% and preferably 13 and 14%, is discharged into a cylindrical, upright tank or bin 11, open on its top and provided with a screw 12 on a vertical shaft 13 which is slowly rotated in the direction of arrow 14 by a motor driven gear (not shown). Tank 11 can be either provided with a single wall exposed to the surrounding atmosphere or with a cylindrical jacket 15. Water of proper temperature and quantity is passed through jacket 15, entering it e. g. through pipe 16 and leaving it through pipe 17. The rice discharged into the top of bin 11 moves slowly downwardly through the latter at a speed determined by the rotation speed of screw 12 which is adjustable. Rice arriving at the bottom of tank 11 is discharged by a screw (not shown) at the lower end of shaft 13 through outlet 18 upon a conveyor or elevator of any desired type, preferably of the bucket type, and transporter and discharged into another tank or bin of the same structure as bin 11.

Referring to Fig. 2, two bins or tanks 11, 19 are shown by way of exemplification (the transport screws 12 being omitted for clarity's sake). Rice discharged from tank 11 is transported by an elevator in the direction 20 to the top of tank 19 and discharged into it, lowered therethrough during a predetermined time period, and discharged at 21 upon a conveyor 22 of any suitable type, the upper run of which moves in the direction of arrow 23 at such a speed that rice deposited on its upper face is transported away at the same rate as it is deposited thereon from the discharge 21. While rice 10 is delivered into tank 11, water is sprinkled thereon from one or more pipes 24 provided with a suitable number of openings on their lower side. In the same way one or more pipes 25 are arranged above the open top of tank 19 and water sprinkled thereby upon the rice discharged into the open top of tank 19 by conveyor 20.

In practice, a battery of tanks or bins 11, 19 etc., is used and all or a smaller number of them arranged in series so that the rice which has passed a first tank is conveyed to and discharged into a second tank, from there to a third, fourth, etc., tank until it is soaked to saturation, and thereupon the completely soaked rice is discharged upon conveyor 22. The number of tanks arranged and used in series depends on the amount of rice to be treated within a given time period, and the speed of conveyor 22 is adjusted so that the amount of rice discharged upon it from the last tank is carried away.

Whether one bin or tank 11 is used only, or two or more tanks or bins 11, 19, etc. are arranged in series, the total quantity of water sprinkled upon the rice while it is discharged in the tank or tanks, is measured or dosed in such a manner that it equals or only slightly exceeds the predetermined quantity of water which the rice 10 discharged into the first bin can absorb during its travel through the bin or series of bins until its discharge upon conveyor 22. As a consequence, the rice moving downwardly through bin 11 and, if so desired, through one or more subsequent bins, comes in contact only and finally with a total quantity of water which the rice can absorb up to its saturation, and soaking of the rice in a large excess of water as heretofore customary is avoided.

If the tank or tanks 11, 19, etc., are provided with a single wall only, as exemplified in Fig. 2, the rice passing the tank and the water in contact with the rice will be of room temperature; if the latter be higher than about 30° C., the room in which the tanks are arranged is to be cooled. Generally, the room temperature will be or kept at about 24 to 26° C. If the room temperature fluctuates or if for other reasons a rather constant temperature level is to be maintained within tanks 11, 19, etc., they are provided with a water jacket 15, and water is passed therethrough of a temperature, constant or varying, so that the temperature within each tank and thereby that of the rice and water in contact therewith is kept at the desired rather constant level and preferably below 30° C. in order to prevent promotion of enzymic or germination actions. If, however, those reactions are of no detrimental effect, for instance because the total time of travel of the rice in contact with the water sprinkled thereon is limited to about 6 to 24 hours, even higher temperatures than 30° C. can be produced within tank or tanks 11, 19, etc., by passing through jacket 15 water of correspondingly higher temperature. In any event, however, a temperature within tank or tanks 11, 19 close to or exceeding about 63° C. should be avoided in order to prevent gelatinization of the rice grains.

The total time period of treating the rough rice in the tank or tanks will usually amount to 12 to 24 hours, and in some cases up to about 3 days.

The bins or tanks are of course made of or provided with a lining of material which does not react detrimentally with constituents of the rice.

By wetting the rough rice with the measured quantity of water it can absorb up to saturation at the temperatures stated, a film of water is formed on the rice grains which is absorbed readily by them while they move slowly downwardly through a tank. The water will penetrate through the hulls and other coverings of the grains into the kernels and dissolve a large percentage of valuable solubles, including vitamins, minerals and salts contained in the coverings and carry them into the kernels which are thereby enriched. The soaked rice grains discharged from a tank will be almost dry, will not stick together and flow freely. If the measured amount of water sprinkled or otherwise brought in contact with the rice slightly exceeds the quantity of water which the rice can absorb, such excess will accumulate above the bottom of a tank and be withdrawn through pump or gate 38 and can be used again for sprinkling or wetting another charge or load of rice. The small percentage of valuable solubles which might be contained in the slight excess of water, is drained off with the latter and, upon recirculation, utilized in soaking a subsequent charge or load of rice. The concentration of those solubles in that slight excess of water will be, however, far higher than in the large excess of water heretofore used, and thereby the efficiency of the process according to the invention is further increased.

While the soaked rice withdrawn from tank 11 or a last tank 19 is carried away by conveyor 22, it is freed from any moisture still adhering to its surface, preferably by directing upon it a blast of air by one or more blowers 24 driven by motor 25. Air from the surrounding atmosphere or, if desired or required, dried, cool or warm air can be used for this purpose. Any other known and suitable means and manner of transporting and drying the withdrawn soaked rice can of course be used.

The soaked and dried rice containing about 29% moisture, is now to be gelatinized. Gelatinization of the starch granules in the rice grains sets in at about 63° C. in the presence of sufficient water and is accompanied by swelling of the grains. Therefore the moisture content of the rice grains has to be increased during gelatinization to about 34 to 35%.

It is preferred to preheat the soaked rice before it is subjected to the gelatinization treatment, and to this effect the conveyor on which the rice is transported to the gelatinization station or apparatus, is passed through a conditioner, such as a heating coil 36, wherein the rice is preheated to about 60 to 70° C. and thereupon discharged into the gelatinization apparatus. Of course, instead of the belt-type conveyor 22 exemplified in the drawing, any other type of conveyor, such as a screw conveyor, can be used the cylindrical housing of which is surrounded by or contains a heating coil or jacket through which hot water or steam is passed for preheating the soaked rice.

According to the embodiment of the invention illustrated in Fig. 2, the gelatinization apparatus comprises a vertical, cylindrical steam chamber 26 provided with an inlet opening 27 on top for the preheated rice discharged in the direction 28 from conveyor 22. Steam is released into chamber 26 near its bottom from suitably arranged pipes 30, 31 and streams upwardly through the chamber, thereby hitting upon the rice grains flowing downwardly therethrough and reducing the velocity of free fall of the rice grains. By proper dimensioning of the height of the steam chamber and controlling in conventional manner the velocity and volume per time unit of the steam released into it, the rice can be made to remain within the chamber for about 1 to 5 minutes.

While the rice moves downwardly through the heating chamber in counterflow with the steam, it is heated above gelatinization temperature of its starch granules and preferably to about 100° C. Some steam condenses on the rice grains and is quickly absorbed by them whereby their moisture content is increased to about 34 to 35% which is required for complete gelatinization. In operation, steam under pressure of about 50 lbs. per square inch and of a temperature of about 120 to 130° C. is released into chamber 26 in controlled volume, so as to heat the rice to about 100° C. and condense thereon the quantity of water which is to be absorbed by the rice during gelatinization. Excess steam is released through one or more pipes 37. The water condensed on the rice grains penetrates through their hulls and other coverings into their kernels, dissolves residues of valuable constituents still in the hulls and coverings and carries them into the swelling kernels undergoing gelatinization. Only an insignificant remnant of those constituents will therefore either remain in the hulls or be washed out by a slight excess, if any, of non-absorbed water on the outer surfaces of the gelatinized rice. The latter leaves the steam chamber through outlet 32 in which a proper gate or discharge screw may be arranged, if desired.

Animal infestation, eggs, larvae, etc., normally present in rice paddy are destroyed during this steam treatment, and weevil infestation is eliminated from the rice product.

The gelatinized rice discharged from the steam chamber 26 is collected on a conveyor of any suitable type, for instance of the endless belt type 33 the upper run of which is moved in the direction of arrow 34 at suitable speed.

The gelatinized rice is now to be dried. In this exemplification of the invention the rice is dried while it is still on the conveyor, by directing upon it blasts of preferably dried and, if so desired, heated air by blowers 35. The drying treatment of this or other type as will be described hereinafter, is continued until the moisture content of the gelatinized rice is reduced to the amount required by the further treatment to which the rice is subjected. If the rice is to be milled and polished, its moisture content should be reduced to about 14%; if other treatments as will be described hereinafter are applied, its moisture content will be reduced to a higher amount only.

Referring to Fig. 3 which illustrates a modification of the invention, the preliminarily cleaned paddy 10 is passed through a horizontal cylinder 39, exposed therein to a stream of saturated steam and thereby heated to about 60 to 70° C. and in any event below gelatinization temperature. Air contained within the hulls of the rice between the starch granules is thereby expanded and escapes through the pores of the hulls. The paddy is discharged from cylinder 39 through pipe 40 into cylinder 41 and moved through the latter in contact with cold or warm water, the latter preferably of a temperature of 24 to 26° C. and usually below about 30° C. In any event, a temperature of about 60° C. should not be exceeded.

Fig. 5 shows rather schematically a cross section through cylinder 39. The paddy 10 is delivered through chute 42 to a conveyor screw 43 on shaft 44 rotated within a cylindrical housing 57 by pulley 45 and belt 46. The conveyor screw discharges the paddy into the space 47 of cylinder 39 into which steam is released through pipe 48. Paddles 49 or the like on shaft 44 agitate the rice while it moves toward the discharge end 50 wherein a conveyor screw 51 on shaft 44 moves the rice into chute 52 and pipe 40.

The structure of cylinder 41 is essentially the same as that of cylinder 39. Pipe 40 delivers the paddy to a conveyor screw on shaft 58, Fig. 3, which moves the paddy into the space of the cylinder where it is agitated by paddles or the like on shaft 58 and finally reaches another conveyor screw on shaft 58 in the left end of cylinder 41 which discharges the rice into pipe 54.

The volume of saturated steam released through pipe 48 into cylinder 39 is controlled manually or automatically so that the paddy travelling through the cylinder is heated to about 60° C., or about 70° C. as a maximum. Thereby air is expelled from the rice grains and thereafter they more avidly absorb additional moisture on their travel through cylinders 41. Moisture is absorbed by the paddy in quite insignificant amount only while it travels through cylinder 39 due to proper control of volume and temperature of the admitted steam.

I wish to state expressly that the structure of the cylinders 39 and 41 is known per se and therefore does not form any subject matter of my invention. It has further been known to heat the paddy travelling through cylinder 39 in order to expel air therefrom, and to use for this purpose saturated steam of manually or automatically controlled volume and temperature. It forms, however, a subject matter of my invention to wet the so treated rice thereafter in cylinder 41 with a measured quantity of water, preferably sprayed upon the rice moving through that cylinder, so that films or the like of water are formed on the individual rice grains which can be absorbed by them completely or essentially in order to increase the moisture content of the rice grains to saturation, or about 29%, and no or only little water adheres to them when they are discharged from cylinder 41. It is further a subject matter of my invention to soak the rice grains in cylinder 41 with water to a lesser extent so that the rice discharged from cylinder 41 contains less than 29%, for instance 17 to 24% moisture only. To any of these effects I measure manually or automatically the quantity of water admitted, for instance, through pipe 53 into cylinder 41 at one or more suitable places so that it equals or only slightly exceeds the quantity of water which the paddy charged into cylinder 41 can or should absorb, or is of a predetermined lesser amount.

Soaked rice discharged from cylinder 41, whether saturated with water or containing less moisture than it can absorb, will be dry or almost dry, and the grains will therefore not stick together and will flow freely. The treatment of rough rice in cylinders 39 and 41 can be completed within about 15 to 30 minutes.

If the rice has been soaked to a lesser moisture content than 29%, it is discharged through pipe 54 into one or more tanks 11, 19, Fig. 3, the same as described hereinbefore with reference to Figs. 1 and 2 and treated therein in the manner described above so that its moisture content is increased to saturation. The fully soaked rice with little or no moisture adhering to its surface, is delivered into tank 55 where it rests for a short period of time, for instance one or several hours; to this effect it moves slowly downwardly through tank 55 (into which no water is delivered) so that surface moisture as well as water still contained in the hulls and other coverings of the grains is absorbed by the kernels.

If the rice has been soaked in cylinder 41 to saturation, it is discharged through pipe 54 directly into tank 55 and permitted to rest therein in the same manner and to the same effect as described hereinbefore.

The fully soaked and rather freely flowing rice is discharged from tank 55 through its outlet 56 upon a conveyor of any suitable type, for instance an endless belt type conveyor 22 the same as described hereinbefore with reference to Fig. 2, and remnants of surface moisture are removed, for instance by air blasts produced by blower 24.

In order to gelatinize the dry and fully soaked rice, according to the embodiment of the invention illustrated in Fig. 3 two cylinders 59, 60 are arranged in series. Cylinder 59 preferably serves for preheating the rice to a temperature of about 70° C. or just below its gelatinization temperature, and cylinder 60 serves to heat further the preheated rice to about 100° C. and to add to it simultaneously the quantity of water required for complete gelatinization.

The preheater 59 may be of any suitable standard structure or as illustrated in Fig. 5. In the latter case the rice passing cylinder 59 is preheated by saturated steam admitted into the cylinder in manually or automatically controlled, limited and suitable volume.

The gelatinizer 60 may also be of any known standard structure, or as shown at 26 in Fig. 2. In the embodiment of the invention illustrated in Fig. 3 a gelatinizer 60 is used as shown rather schematically in cross section in Fig. 6. It comprises a jacket 61 into which steam is admitted through pipe 62 and released through pipe 63. Cylinder 64 is arranged inside jacket 61 and provided with perforations 65 of smaller diameter than the rice grains. A hollow shaft 66 is passed air-tightly through the front walls 69 of jacket 61 to the outside and provided with a pulley 67 driven by a belt 68; the other end of hollow shaft 66 projects through the front walls 69 of jacket 61 to hollow head 70 into which pipe 71 opens. Shaft 66 is provided with apertures 72 of smaller diameter than the rice grains; a worm 73 is mounted on shaft 66. The soaked and preheated paddy is fed from preheater 59 through pipe 74 into the space within the perforated cylinder 64 and move therethrough by worm 73 rotated by shaft 66 and pulley 67 at suitable speed. The steam admitted through pipe 62 into jacket 61 is of such a temperature that the interior wall 75 of jacket 61 is kept well above 100° C., preferably at about 110° C. Steam of a pressure preferably not exceeding about 50 lbs. per square inch and therefore of a temperature of about 110 to 120° C. is released through pipe 71, head 70, hollow shaft 66 and apertures 72 into the space within wall 75 and perforated cylinder 64 which communicates through pipe 77 with the surrounding atmosphere. By properly controlling the volume of steam thus admitted into the space of perforated cylinder 64, wherein atmospheric pressure prevails, it can easily be achieved that the charge of rice moved through cylinder 64 is heated from about 60 to 70° C. to which it was preheated, to about 100° C. and that water is condensed on that rice in a quantity just sufficient to increase its moisture content to about 35% when its gelatinization and swelling is completed. After the rice fed through pipe 74 into cylinder 64 has thus been gelatinized, it is discharged through pipe 77. By providing the steam jacket the interior of wall 75 of which is held at a temperature of about 110° C., accumulation of water within the gelatinizer is prevented; water condensing on the screw 73 or cylinder 64 will drop through perforations 65 upon the steam jacket kept at a temperature of 110° C. where it is steamed off again. Therefore, if the volume and temperature of the steam admitted through pipe 71 is properly controlled manually or automatically, gelatinization of the rice is secured without condensing thereon excess moisture which can not be absorbed and might cause the rice grains to stick together.

The substantially freely flowing rice leaving gelatinizer 60 is discharged through pipe 77 upon a conveyor of any conventional type, such as endless belt conveyor 33 and exposed thereon to cooling by cold air, e. g. air blasts from blower 35. Thereby any surface moisture still adhering to the rice grains is removed and the size of the swollen rice grains is set without reducing substantially their moisture content.

It will be appreciated from the above that the soaking process illustrated in Fig. 2 or any one of the soaking processes illustrated in Fig. 3, followed by any suitable gelatinization treatment, produce gelatinized rice grains which do not stick together and are set to size of desirable appearance. Most of the valuable constituents contained in the hulls and other coverings of the rice are transferred into the gelatinized kernels. Mass production requiring least skill in operation is possible. The charges or loads delivered to the tanks in a process according to Figs. 1, 2 or to the moisture absorption and conditioning apparatus in a process according to Fig. 3 can be easily weighed. The temperature and quantity of water sprayed on the rough rice and the temperature and volume of steam released into cylinder 39 can be set once and for all for a given rice charge or load, or regulated manually or automatically. Similarly the speed at which the rice is moved through preheater 59 and gelatinizer 60 and the volumes and temperatures of steam to be admitted to the various parts thereof can be set manually after a few experiments, and automatic regulations devised therefor by any one skilled in the art.

Which ever of the processes hereinbefore described and illustrated be used for producing gelatinized rice freed of any surface moisture, the treatments hereinafter described can be applied to that rice product.

According to one feature of the invention, the gelatinized and set to size rice is delivered from conveyor 33, Fig. 3, to a dryer 78 of any conventional type in which the rice is dried e. g. by steam or hot air in order to reduce its moisture content. However, the moisture content is not reduced to the one heretofore considered suitable for milling; i. e. about 13 to 14%, but to a higher moisture content between about 17 to 24%, and preferably about 20%. I have found that gelatinized rice of this moisture content mills well and that the milled rice product is pliable and can be given any desired shape. Therefore, the gelatinized rice dried to about 17 to 24% moisture content in dryer 78 is run through breaking or shaping rollers 79, if desired (and therefore indicated by dotted lines), where rice grains which stick together are separated and deformations of rice grains, if any resulted from the steam treatment, are smoothened and the grains straightened out. The separating or shaping rollers can be arranged between conveyor 33 and dryer 78, if desired, instead at the place illustrated.

The dried rice of the moisture content stated is thereafter milled in miller 80 and passed in pliable state between shaping rollers 81 which impart to the milled rice grains a desired uniform shape. For instance, round or short hulled rice grains are shaped by rollers 81 to long rice grains so that the rice product leaving rollers 81 substantially comprises long rice grains and is therefore of greater sales value than a rice product comprised of long and short, or long, short and round grains. Short rice grains mature earlier than long ones and cause less breakage during milling. Therefore, if short rice grains are subjected to the process of the invention and dried to a higher moisture content than heretofore used, thereafter milled and shaped into long grains, breakage in the miller is reduced and nevertheless a product of higher sales value obtained.

The milled and shaped rice grains of the higher moisture content stated are thereafter either dried immediately in a dryer 82 of any conventional type so as to reduce their moisture content to about 13 to 14% at which the rice product is ready for storage, shipping or consumption, or subjected first to a treatment in a washer 83 in which useful and oxidizable oils and fats contained in the rice are removed.

To this effect the rice is treated in the washer with suitable solvents for the useful and/or oxidizable (and therefore objectionable) fats and oils, such as hydrocarbons of the type of petroleum fractions, e. g. hexane, pentane, etc., which dissolve those oils and fats as well as resins and edible oils contained in the rice, whereas nutritive vitamins, minerals, etc. are not removed by those solvents. Any other washing agent can be used in washer 83 which also removes other impurities contained in or adhering to the rice.

The rice treated in washer 83 is thereafter dried in dryer 82 in order to remove therefrom any adhering remnants of the solvent or washing agent and also to reduce its moisture content to about 13 to 14% suitable for storing, etc.

Instead of drying the milled rice of the higher moisture content stated in any of the ways described hereinbefore, it can be run from miller 80 through a flaking apparatus, such as between flaking rolls 84. As stated before, milled rice of the higher moisture content, such as about 20%, is pliable and can therefore be flaked conveniently. After flaking or other desired shaping, the rice can also be given a desired flavor. It also can be enriched by contacting it with a solution of any desired nutritive product or products, such as minerals, and in particular iron, and vitamins as will be described hereinafter and is therefore not shown in the flow sheet of Fig. 3.

The flaked or otherwise shaped rice product, if desired flavored and enriched, can thereafter be roasted, preferably in a sand roaster 85 wherein the rice product is mixed with sand of suitable temperature and left for a sufficient period of time. The roasted rice product can easily be segregated thereafter from the sand. Whichever way the shaped rice is treated thereafter, for instance a desirable breakfast cereal is obtained upon subsequent drying. If the rice product is roasted, excess moisture above about 13 to 14% can be removed in the roasting process, if so desired.

The invention also embraces drying the gelatinized rice to the conventional moisture content of about 13 to 16% before milling. Referring to Fig. 4, set to size gelatinized rice is delivered from conveyor 33 into dryer 78 of any conventional type in which the moisture content of the rice is reduced preferably to about 13 to 14%, and the dried rice delivered to a miller 80. The milled rice is passed thereafter through breaking or shaping rolls 81 which separate rice grains which stick together and also remedy deformations of rice grains, which might have been caused by the foregoing steaming of the rice. Thereafter the rice is run through another dryer 86 and is ready for storing, shipping and consumption, etc.

Gelatinized rice dried in dryer 78, Fig. 4, to a moisture content of about 13 to 14% can also be run through miller 80 and thereafter washer 83 for removing therefrom oxidizable and other oils and fats and/or impurities. The washed rice is then run through an auxiliary dryer 87 in order to remove any still adhering solvent or other washing agent, and thereafter polished or brushed in a standard apparatus 88. If a miller 80 used in any other process described hereinbefore does not remove the polish and bran from the gelatinized rice, the milled rice product can also be run through a polishing and brushing apparatus before it is stored, shipped, etc.

As a further alternative, the rice obtained from miller 80 and, if so desired, passed through washer 83 can be enriched by passing it through an enriching tumbler 89. To this effect, the desired nutritive substances, such as minerals and/or vitamins, can be dissolved or suspended in water or any other suitable volatile liquid solvent or suspension medium which is not detrimental for human consumption, and a measured quantity of the solution or suspension for instance sprayed over the milled rice while it moves rapidly within a tumbler of standard construction. The amount of the solution or suspension should be measured so that the moisture absorbed therefrom by the milled rice does not increase its moisture content by more than about 1% by weight; the thus treated and enriched rice product is passed thereafter through auxiliary dryer 87 in order to remove therefrom moisture absorbed during tumbling and enriching. Also digestible coloring substances may be added to the solvent or suspension medium, with or without enriching substances, so as to color the rice product treated according to the invention and distinguish it thereby from other products on the market.

As stated hereinbefore, an enriching and/or coloring treatment of the type just described can also be applied to milled rice of a higher moisture content, about 17 to 24%, and the enriching treatment and apparatus interpolated between shaping rollers 81 and dryer 82, etc., in the various processes illustrated in Fig. 3. Milled, gelatinized rice of lowest or higher moisture content retains the solutes or suspended matter of nutritive substances as exemplified hereinbefore, such as minerals, iron and vitamins, on its surface and is also capable of absorbing them to great extent.

The rice product obtained according to the invention exhibits usually a glassy surface and therefore need not be treated with talcum and glucose heretofore used for enhancing the appearance of the rice product. The glassy product neither gathers foreign matter nor insects and is therefore suited for extended storage.

It should be understood that the invention is not limited to any of the explanations, theories and exemplifications hereinbefore stated and is to be derived in its broadest aspects from the appended claims.

What I claim is:

1. A method of preparing rice for milling, including the steps of treating the rice for one half to three days between room temperature and about 60° C. with a measured quantity of water substantially equalling that the rice can absorb whereby to raise its moisture content to about 29%, treating the rice substantially at atmospheric pressure with steam for a period limited to heat the rice above 70° C. and increase its moisture content by condensed and absorbed water to about 34% to 35% and gelatinize the rice, and dry the rice to a moisture content between about 14% to 24%.

2. A method of preparing rice for milling, including the steps of treating rice containing about 13% to 16% moisture for one half to three days between room temperature and about 30° C. with a measured quantity of water substantially equalling that the rice can absorb whereby to raise its moisture content to about 29%, treating the rice with steam of a temperature above 100° C. up to about 130° C. for a period sufficient to heat the rice to about 100° C. and increase its moisture content to about 34% to 35% and gelatinize it, and drying the rice to a moisture content between about 14% and 24%.

3. A method of preparing rice for milling, including the steps of treating rice containing about 13% to 16% moisture for one half to three days between room temperature and about 30° C. with up to about 16% by weight of water, the quantity of that water substantially equalling that the rice can absorb whereby to raise its moisture content to about 29%, treating the rice with steam of a temperature above 100° C. up to about 130° C. for a period limited to heat the rice to gelatinisation temperature and increase its moisture content by condensed and absorbed water to about 34% to 35% whereby to gelatinize the rice, and drying the rice to a moisture content between about 14% and 24%.

4. A method of preparing rice for milling, including the steps of treating rice containing about 13% to 16% moisture for one half to three days between room temperature and about 30° C. with a measured quantity of water substantially equalling that the rice can absorb whereby to raise its moisture content to about 29%, exposing the rice to air whereby to allow moisture on the surface and in the hulls to be absorbed by the kernels of the rice, treating the rice with steam of a temperature above 100° C. up to 130° C. at substantially atmospheric pressure for a period sufficient to heat the rice to about 100° C. and increase its moisture content to about 34% to 35% and gelatinize it, and drying the rice to a moisture content between about 14% and 24%.

5. In a method as set forth in claim 1, the step of heating the rice containing about 29% moisture by steam of about 50 lbs. released into space of substantially atmospheric pressure for from one to five minutes to raise the temperature of the rice to about 100° C. and gelatinize it.

6. In a method as set forth in claim 2, the step of exposing the rice to saturated steam to heat the rice to about 60° and expel air from within the hulls of the rice before treating it with water.

7. In a method as set forth in claim 2, the step of preheating the rice of a moisture content of about 29% to about 60° C. to 70° C. before treating it with steam.

8. A method of treating rice for milling as claimed in claim 1, including the step of heating the rice with steam to about 100° C. by passing the rice downwardly through confined space in counterflow to the steam.

ATAULLAH K. OZAI-DURRANI.

REFERENCES CITED

The following references are of record in the file of this patent:

UNITED STATES PATENTS

| Number | Name | Date |
| --- | --- | --- |
| 1,377,125 | Gurjar | May 3, 1921 |
| 1,987,304 | Menke | Jan. 8, 1935 |
| 2,287,737 | Huzenlaub | Jun. 23, 1942 |
| 2,318,999 | Jones et al. | May 11, 1943 |
| 2,358,250 | Rogers | Sept. 12, 1944 |
| 2,358,251 | Huzenlaub | Sept. 12, 1944 |

FOREIGN PATENTS

| Number | Country | Date |
| --- | --- | --- |
| 446,762 | Great Britain | May 6, 1936 |
| 494,085 | Great Britain | Oct. 20, 1938 |